Sept. 14, 1926.
S. OTANI
DIRECTION INDICATOR
Filed Nov. 7, 1923    2 Sheets-Sheet 1
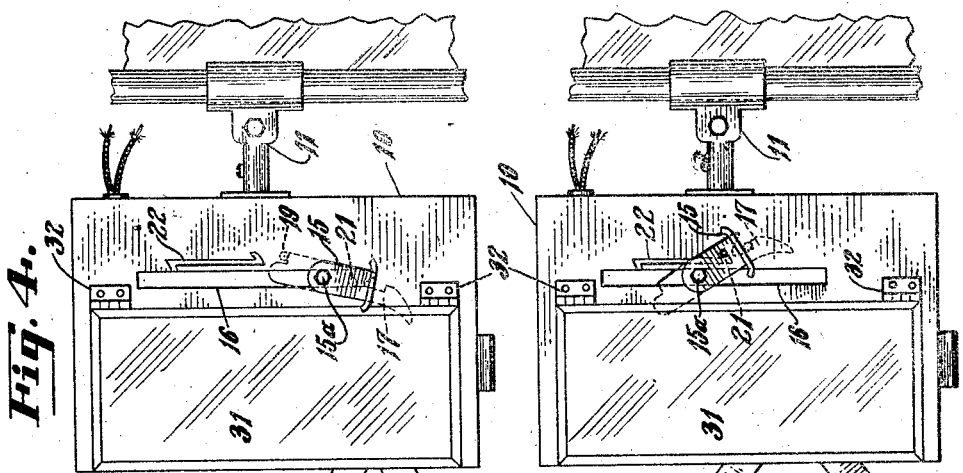
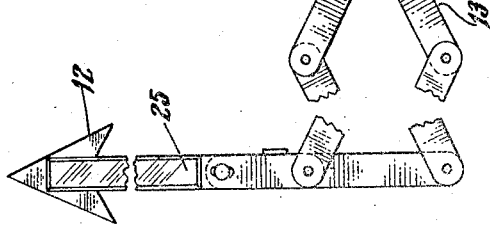
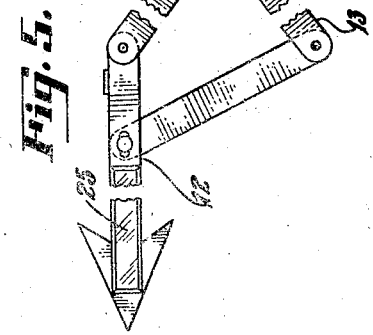
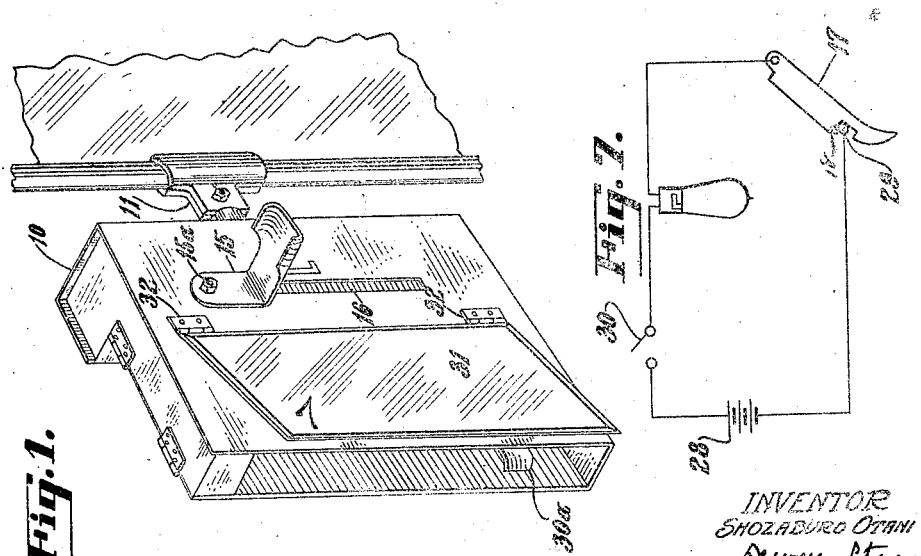
INVENTOR
SHOZABURO OTANI
BY Dewey, Strong,
Townsend & Loftus
ATTORNEYS

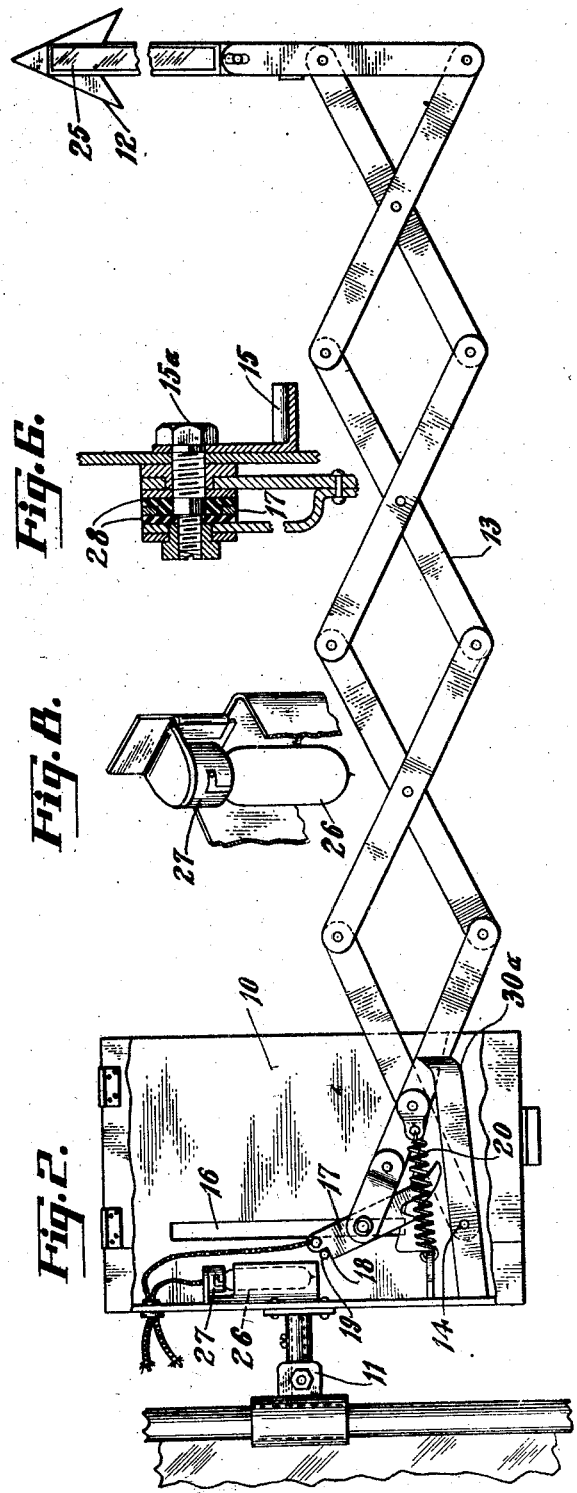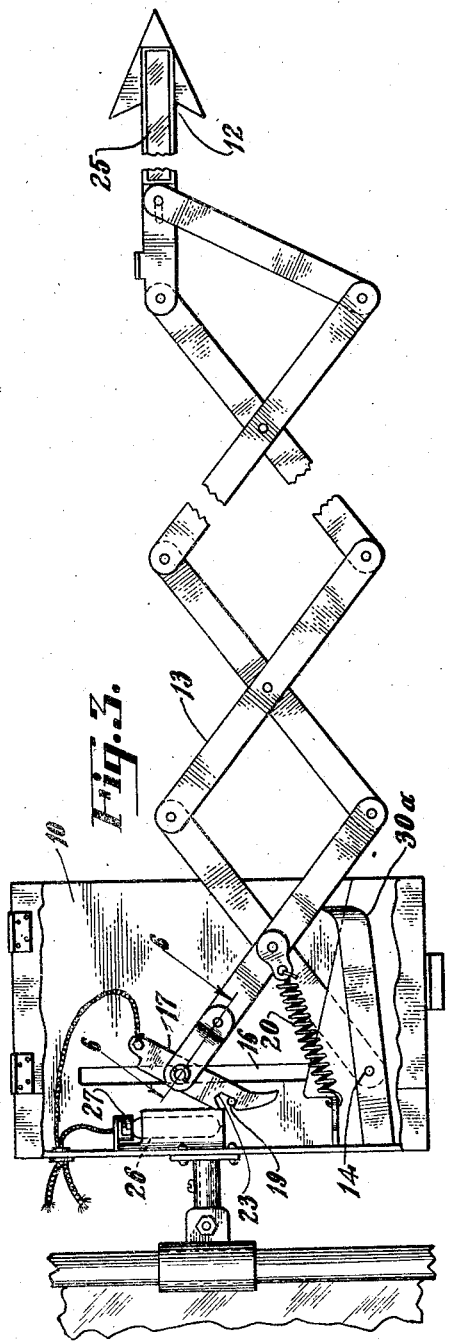

Patented Sept. 14, 1926.

1,599,785

UNITED STATES PATENT OFFICE.

SHOZABURO OTANI, OF WINTERS, CALIFORNIA.

DIRECTION INDICATOR.

Application filed November 7, 1923. Serial No. 673,341.

This invention relates to a direction indicator particularly adapted for use on automobiles.

It is the principal object of the present invention to provide a generally improved direction indicator for vehicles, which indicator will provide means by which the intended direction of travel of the vehicle may be indicated to those in front or in the rear of the vehicle. The structure is of simple and inexpensive construction and will not detract from the appearance of a car upon which it is mounted.

In carrying out this object, I provide a semaphore arm which may be mounted at the side of the windshield of an automobile and which is operable that it may be extended to indicate the intended direction of travel of the vehicle. The device includes an illuminating means, the circuit of which will be automatically closed when the semaphore arm is in an indicating position.

One form which the invention may assume is exemplified in the following description and illustrated by way of example in the accompanying drawings, in which:

Fig. 1 is a perspective view of the preferred form of my invention shown attached to the frame of an automobile windshield.

Figs. 2 and 3 are front elevations of the indicator shown in different indicating positions and with parts of the housing broken away to clearly disclose certain details of construction.

Figs. 4 and 5 are rear elevations of the indicator disclosing it in different indicating positions.

Fig. 6 is a fragmentary view in section taken on line 6—6 of Fig. 3 and disclosing insulated mounting of the latch member.

Fig. 7 is a wiring diagram of the circuit of the illuminating light in the indicator housing.

Fig. 8 is a fragmentary view in perspective showing the mounting of the lamp in the indicator housing.

Referring more particularly to the accompanying drawings, 10 indicates a rectangular housing which may be mounted at the side of a vehicle and connected to the frame bar of the windshield thereof by an adjustable bracket 11. Adapted to be inclosed within this housing is a semaphore arm 12 which is arrow shaped. This arm is pivotally connected to the outer end of a lazy tong structure 13, the inner end of which structure is connected to the housing 10 at a point within the same. At the inner end of the lazy tong structure, one of the levers is pivotally connected as at 14 to the housing 10. The other one connects with an operating member 15 which is located exterior of the rear wall of the housing. This member may be grasped by the driver of the automobile to extend the lazy tong structure and thereby operate the semaphore arm. A pin 15$^a$ connects the operating member 15 to the lazy tong structure and is adapted to operate in a slot 16 formed in the rear wall of the housing 10. This slot is vertically disposed and by shifting the member 15 vertically the semaphore arm may be extended to an indicating position and returned and concealed in the housing.

It is intended that the semaphore arm be operated to indicate the intended direction of travel of the vehicle. To indicate that the vehicle is to turn to the right, the operating member is depressed to fully extend the lazy tong structure and dispose the semaphore arm in a vertical position as shown in Fig. 2. To latch it in this position I provide a latch member 17 which is fixed on the pin 15$^a$ which connects the operating member 15 to the lazy tong structure 13. When the operating member is at the bottom of the slot 16 and the lazy tong structure is fully extended, the operating member 15 may be turned so that a shoulder 18 on the latch 17 will engage with a latch pin 19 fixed within the housing. This will latch the semaphore arm in an indicating position. When it is desired to return the semaphore arm to a concealed position within the housing, the operating member 15 is turned to release the latch 17 from engagement with the pin 19. This will permit a tension spring 20 to automatically return the semaphore arm and the lazy tong structure to a position within the housing.

Should it be desired to indicate that the vehicle is to turn to the left, the lazy tong structure is only partially extended so as to dispose the semaphore arm horizontally. This is accomplished by turning the member 15 so that a lug 21 on the under side thereof will engage with a groove 22 formed parallel to the slot 16. This groove is of a length that the member 15 may be moved a distance which will not fully extend the lazy tong structure. This distance is sufficient to dispose the semaphore arm horizontally, The arm may be latched in this position by turning the lever 15 to cause a notch 23 at the lower end of the latch member 17 to engage with the pin 19. The semaphore arm when in this position may be returned to normal position by simply turning the operating member to release the latch 17 from engagement with the latch pin 19 so as to permit the spring 20 to draw the semaphore arm and the lazy tong structure within the housing.

It is found desirable to provide means for illuminating the semaphore arm that it may be seen at night. I accomplish this by fitting the surface of the arm with a panel of colored glass 25. Within the housing 10 I mount an incandescent bulb 26. This bulb is mounted in a socket 27 which may be detachably connected to the housing 10 as clearly shown in Fig. 8. As the outer end of the housing is open, when the lamp is illuminated, its rays will be reflected on the panels 25 to illuminate the same. The circuit of the incandescent lamp is automatically closed when the semaphore arm is extended to either of its indicating positions.

The circuit of the lamp is clearly shown in Fig. 7 and comprises a source of electrical energy 28 which is grounded to the housing at one side as at 29. The other side of the battery may be led through a switch 30 to to the lamp. This switch may be located at any point convenient to the driver of the car. The other lead from the lamp is led to the latch member 17 which is insulated from the lamp housing by insulating washers 28 shown in Fig. 6. It is obvious from this that when the latch member 17 is in engagement with the latch pin 19, that when the switch 30 is closed, a complete circuit will be formed through the lamp to illuminate the same.

In actual operation, if it is desired to indicate the vehicle is to turn to the right, the member 15 is depressed to fully extend the lazy tong structure and thereby dispose the semaphore arm in a vertical position. It may be latched in this position by simply turning the operating member 15 to engage the latch member 17 of the latch pin 19. When it is desired to return the lazy tong structure and the semaphore arm to a concealed position within the housing 10, the member 15 may be turned to release the latch 17 from engagement with the pin 19. The tension spring 20 will then act to return the lazy tong structure and semaphore arm to a concealed position within the housing.

Should it be desired to indicate that the vehicle is to turn to the left, the member 15 is turned until the lug 21 on the operating lever is engaged with the groove 22 in the housing. The operating member may then be depressed to extend the lazy tong structure an amount sufficient to dispose the semaphore arm in a horizontal position as shown in Fig. 3. In this position the member 15 may be turned to engage the notch 23 in the lower end of the latch 17 with the latch pin 18, thus latching the semaphore arm in position. To return the semaphore arm from this position, the lever 15 is turned to discontinue the engagement between the latch member 17 and the pin 19. The spring 20 will then draw the lazy tong and the semaphore arm to a concealed position within the housing.

To prevent the structure from rattling, I provide a flat spring 30$^a$, which spring is mounted in the housing and will engage the lazy tong structure to prevent it from rattling against the side of the housing.

When the device is to be employed at night, the switch 30 of the lamp circuit may be closed. This will cause the lamp 26 to be illuminated each time the semaphore arm is extended to an operating position.

For the convenience of the driver of the car, I mount a rear-sight mirror 31 on the rear of the housing. This mirror is connected to the housing by hinges 32 so that the driver may adjust it as desired.

From the foregoing, it is obvious that a very simple and efficient direction indicator has been provided, which indicator may be operated to indicate the intended direction of travel of a vehicle upon which it is fixed.

While I have shown the preferred form of my invention as now known to me, I wish it understood that various changes may be made in its construction without departing from the invention as defined in the appended claim.

Having thus described my invention, what I claim and desire to secure by Letters Patent is:—

A direction indicator for automobiles comprising a housing adapted to be mounted at one side of an automobile, the outer end of said housing being open, a pair of vertical parallel slots of different lengths formed in one side of the housing, an operating member disposed exteriorly of the housing, a pin fixed to said operating member and projecting through one of the slots, said slots intercommunicating whereby said pin may be vertically reciprocated in either slot, a latch member disposed interiorly of the housing and centrally fixed on said pin whereby it will be relatively fixed to said operating member, a lazy tong structure adapted to be contained within the housing or projecting through the open end thereof, the levers at the outer end of the lazy tong structure carrying a semaphore arm, the end of one of the levers of the inner end of the lazy tong structure being pivotally connected to the housing within the same, the end of the other lever of the inner end of the lazy tong structure being connected to said pin whereby vertical movement of said pin in said slots will actuate the lazy tong structure, movement of said pin in the longer slots disposing said semaphore arm in one signaling position and movement of said pin in the shorter slot moving said arm in a second signaling position, means for latching said lazy tong structure in either signaling position, said means comprising a latch pin fixed within the housing, notches formed at opposite ends of said latch member which may be engaged with said latch pin by pivotal movement of the operating member, the notch at one end being engageable with said latch member when the semaphore arm is in one signaling position and the notch at the other end of said latch member being engageable with the latch pin when the semaphore arm is in the second signaling position.

SHOZABURO OTANI.